US010776059B2

United States Patent
Mukai et al.

(10) Patent No.: US 10,776,059 B2
(45) Date of Patent: Sep. 15, 2020

(54) INFORMATION PROCESSING APPARATUS, INFORMATION STORING APPARATUS, AND IMAGE FORMING SYSTEM

(71) Applicants: Kyohhei Mukai, Kanagawa (JP); Keisuke Mori, Tokyo (JP)

(72) Inventors: Kyohhei Mukai, Kanagawa (JP); Keisuke Mori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/431,986

(22) Filed: Jun. 5, 2019

(65) Prior Publication Data

US 2020/0034095 A1 Jan. 30, 2020

(30) Foreign Application Priority Data

Jul. 30, 2018 (JP) .................................. 2018-142988

(51) Int. Cl.
G06F 3/12 (2006.01)
H04N 1/00 (2006.01)

(52) U.S. Cl.
CPC .......... *G06F 3/1259* (2013.01); *G06F 3/1205* (2013.01); *G06F 3/1238* (2013.01); *H04N 1/00408* (2013.01)

(58) Field of Classification Search
None
See application file for complete search history.

(56) References Cited

U.S. PATENT DOCUMENTS

| 2012/0229851 A1* | 9/2012 | Nishida | ................. G06F 3/1238 358/1.15 |
|---|---|---|---|
| 2015/0116754 A1 | 4/2015 | Mukai | |
| 2015/0116756 A1 | 4/2015 | Mori | |
| 2015/0116764 A1 | 4/2015 | Mori | |
| 2015/0277830 A1 | 10/2015 | Mukai | |
| 2015/0317551 A1 | 11/2015 | Mori | |

(Continued)

FOREIGN PATENT DOCUMENTS

| JP | 2013-050757 | 3/2013 |
|---|---|---|
| JP | 2013-109645 | 6/2013 |

(Continued)

*Primary Examiner* — Frantz Bataille
(74) *Attorney, Agent, or Firm* — IPUSA, PLLC

(57) ABSTRACT

An information processing apparatus is communicable with an information storing apparatus that is communicable with plural image forming apparatuses connected to a network and stores storage apparatus information identifying an image forming apparatus storing, for each user, job information associated with user information. The information processing apparatus includes first one or more processors that, in response to receipt of an operation performed by a user, acquires, from the information storing apparatus, storage apparatus information identifying one or more image forming apparatuses of the plural image forming apparatuses storing job information associated with user information of the user, acquires the job information associated with the user information of the user from the one or more image forming apparatuses of the plural image forming apparatuses identified based on the storage apparatus information, generates a job list based on the acquired job information, and displays the generated job list on a display.

14 Claims, 13 Drawing Sheets

(56) References Cited

U.S. PATENT DOCUMENTS

| | | |
|---|---|---|
| 2016/0224298 A1* | 8/2016 | Nogawa .................. H04N 1/00 |
| 2016/0277631 A1 | 9/2016 | Mori |
| 2017/0149985 A1* | 5/2017 | Nomura ................ G06F 3/1267 |
| 2017/0371598 A1 | 12/2017 | Mori |
| 2018/0032708 A1 | 2/2018 | Mori et al. |

FOREIGN PATENT DOCUMENTS

| | | |
|---|---|---|
| JP | 2014-149743 | 8/2014 |
| JP | 2014-178899 | 9/2014 |
| JP | 2014-179027 | 9/2014 |
| JP | 2014-225785 | 12/2014 |
| JP | 2015-085597 | 5/2015 |
| JP | 2015-088019 | 5/2015 |
| JP | 2015-088020 | 5/2015 |
| JP | 2015-191651 | 11/2015 |
| JP | 2016-048525 | 4/2016 |
| JP | 2016-107512 | 6/2016 |
| JP | 2016-177372 | 10/2016 |
| JP | 2016-177551 | 10/2016 |
| JP | 2017-167680 | 9/2017 |
| JP | 2018-005312 | 1/2018 |
| JP | 2018-191155 | 11/2018 |

* cited by examiner

FIG. 8

| USER NAME | PASSWORD |
|---|---|
| UserA | aula |
| UserB | best |
| UserC | cup |

FIG. 9A

| COLUMN NAME | PARAMETER |
|---|---|
| DOCUMENT ID | id |
| USER NAME | user_name |
| JOB NAME | job_name |
| JOB STORAGE SOURCE | data_path |
| STORAGE LANGUAGE | printer_lang |
| NUMBER OF PAGES | pages |
| SIDE SETTING | duplex |
| COLOR INFORMATION | color |
| QUANTITY | copies |

FIG. 9B

| COLUMN NAME | PARAMETER EXAMPLE |
|---|---|
| DOCUMENT ID | 100 |
| USER NAME | user_A |
| JOB NAME | aaa.Txt |
| JOB STORAGE SOURCE | C:\data |
| STORAGE LANGUAGE | PCL |
| NUMBER OF PAGES | 10 |
| SIDE SETTING | 1 (simplex), 2 (duplex) |
| COLOR INFORMATION | 1 (monochrome), 2 (color) |
| QUANTITY | 5 |

FIG. 10A

| COLUMN NAME | PARAMETER |
|---|---|
| USER NAME | user_name |
| STORAGE APPARATUS HOST NAME | device_host_name |
| STORAGE APPARATUS IP ADDRESS | device_ip_address |
| STORAGE APPARATUS IP ADDRESS (IPv6) | latest_access_time |
| STORAGE APPARATUS PORT NUMBER | device_port_num |

FIG. 10B

| COLUMN NAME | PARAMETER EXAMPLE |
|---|---|
| USER NAME | user_A |
| STORAGE APPARATUS HOST NAME | host_A |
| STORAGE APPARATUS IP ADDRESS | 10.20.30.40 |
| STORAGE APPARATUS IP ADDRESS (IPv6) | 10:20:30:40:50:60:70:80 |
| STORAGE APPARATUS PORT NUMBER | device_ip_address |

PRINTING IS IN PROGRESS. PLEASE WAIT FOR A WHILE.

JOB NAME : aaa.txt

STORAGE DATE AND TIME: 2013/01/01   12:30:00

NUMBER OF PAGES: 10

INFORMATION PROCESSING APPARATUS, INFORMATION STORING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2018-142988 filed on Jul. 30, 2018, in the Japan Patent Office, the entire disclosure of which is hereby incorporated by reference herein.

BACKGROUND

Technical Field

The present invention relates to an information processing apparatus, an information storing apparatus, and an image forming system.

Description of the Related Art

There is a secure print function that temporarily stores print jobs in a hard disk drive (HDD) of an image forming apparatus, displays a list of the stored print jobs (i.e., jobs) to a user when the user logs in to the image forming apparatus, and executes printing of a job selected from the list by the user. Further, there is a job list combining function, according to which when one of a plurality of image forming apparatuses in a wide area network (WAN) is logged in to by a user, the image forming apparatus communicates with the other image forming apparatuses and displays, on a single screen, all jobs associated with user information and stored in the plurality of image forming apparatuses.

According to such functions, however, the image forming apparatus acquires the job list by checking with each of the image forming apparatuses connected to the network to determine whether the job information associated with the user information is stored therein. This may cause unnecessary communication such as checking with an image forming apparatus not storing the job information to determine whether the job information is stored therein.

SUMMARY

In one embodiment of this invention, there is provided an improved information processing apparatus communicable with an information storing apparatus. The information storing apparatus is communicable with a plurality of image forming apparatuses connected to a network, and stores storage apparatus information. The storage apparatus information identifies an image forming apparatus storing, for each user, job information associated with user information. The information processing apparatus includes, for example, first one or more processors that, in response to receipt of an operation performed by a user, acquire, from the information storing apparatus, storage apparatus information identifying one or more image forming apparatuses of the plurality of image forming apparatuses storing job information associated with user information of the user, acquire the job information associated with the user information of the user from the one or more image forming apparatuses of the plurality of image forming apparatuses identified based on the storage apparatus information, generate a job list based on the acquired job information, and display the generated job list on a display.

In one embodiment of this invention, there is provided an improved information storing apparatus communicable with a plurality of image forming apparatuses connected to a network. The information storing apparatus includes, for example, a memory and second one or more processors. The memory stores storage apparatus information identifying an image forming apparatus storing, for each user, job information associated with user information. The second one or more processors receive the storage apparatus information transmitted from each image forming apparatus of the plurality of image forming apparatuses, store the received storage apparatus information in the memory, refer to the memory based on user information received from an information processing apparatus operated by a user, acquire storage apparatus information identifying one or more image forming apparatuses of the plurality of image forming apparatuses storing job information associated with the received user information, and transmit the acquired storage apparatus information to the information processing apparatus from which the user information is received.

In one embodiment of this invention, there is provided an improved image forming system that includes, for example, an information storing apparatus and an information processing apparatus. The information storing apparatus is communicable with a plurality of image forming apparatuses connected to a network. The information processing apparatus is communicable with the information storing apparatus. The information storing apparatus includes a memory and second one or more processors. The memory stores storage apparatus information identifying an image forming apparatus storing, for each user, job information associated with user information. The second one or more processors receive the storage apparatus information transmitted from each image forming apparatus of the plurality of image forming apparatuses, store the received storage apparatus information in the memory, refer to the memory based on user information received from the information processing apparatus, acquire storage apparatus information identifying one or more image forming apparatuses of the plurality of image forming apparatuses storing job information associated with the received user information, and transmit the acquired storage apparatus information to the information processing apparatus from which the user information is received. The information processing apparatus includes first one or more processors. In response to receipt of an operation performed by a user, the first one or more processors transmit user information of the user to the information storing apparatus, receive storage apparatus information corresponding to the user information of the user from the information storing apparatus, acquire job information associated with the user information of the user from one or more image forming apparatuses of the plurality of image forming apparatuses identified based on the storage apparatus information, generate a job list based on the acquired job information, and display the generated job list on a display.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a diagram illustrating an example of the configuration of user authentication information according to the first embodiment;

FIGS. 9A and 9B are diagrams illustrating an example of the configuration of print job information according to the first embodiment;

FIGS. 10A and 10B are diagrams illustrating an example of the configuration of storage apparatus information according to the first embodiment;

FIG. 15 is a diagram illustrating an example of a print-in-progress display screen according to the first embodiment;

Figure 1:
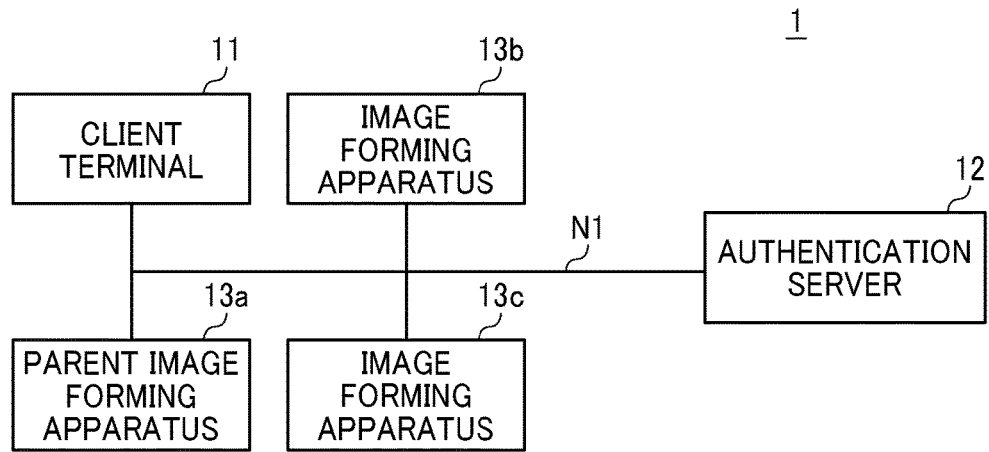
FIG. 1 is a block diagram illustrating an example of the configuration of a printing system according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments for implementing the present invention will be described below with reference to the drawings. In the following embodiments, terms "image formation" and "printing" will be synonymously used. It should be understood, however, that image formation is not limited to printing but also includes other forms of outputting such as scanning and facsimile transmission, for example.

A first embodiment of the present invention will be described.

In the first embodiment, a description will be given of a printing system in which an image forming apparatus functions as a job list acquiring apparatus that acquires a job list. The job list acquiring apparatus, however, is not limited to the image forming apparatus, and may include any other information processing apparatus capable of acquiring a job list.

A system configuration of the printing system according to the first embodiment will be described.

FIG. 1 is a block diagram illustrating an example of the configuration of the printing system according to the first embodiment. A printing system 1 includes a client terminal 11, an authentication server 12, a parent image forming apparatus 13a, an image forming apparatus 13b, and an image forming apparatus 13c, which are connected via a network N1 such as a local area network (LAN) or a WAN. In the following description, the parent image forming apparatus 13a, the image forming apparatus 13b, and the image forming apparatus 13c may be collectively referred to as the image forming apparatuses 13 for simplification of description. In the printing system 1, users and computer resources are managed by Active Directory (registered trademark), for example.

Each of the client terminal 11, the authentication server 12, and the image forming apparatuses 13 includes a communication device that performs wired or wireless communication. FIG. 1 illustrates an example in which the printing system 1 includes one client terminal 11 and one authentication server 12. The printing system 1, however, may include a plurality of client terminals 11 and a plurality of authentication servers 12. Further, in the illustrated example, the printing system 1 includes three image forming apparatuses 13. However, the number of image forming apparatuses 13 is not limited to three.

It is desirable to select one of the plurality of image forming apparatuses 13 in the printing system 1 as the parent image forming apparatus 13a. However, the printing system 1 may include a plurality of parent image forming apparatuses 13a.

The client terminal 11 is a terminal apparatus used by a user, such as a smartphone, a mobile phone, or a personal computer (PC). The client terminal 11 is capable of transmitting a print job to any of the image forming apparatuses 13. In the first embodiment, the print job refers to information enabling the image forming apparatus 13 to perform a printing process. In the following, the print job may simply be referred to as the job.

The authentication server 12 is implemented by one or more information processing apparatuses. The authentication server 12 holds information related to authentication, such as user authentication information, and performs authentication in response to a request from one of the image forming apparatuses 13, for example.

Each of the image forming apparatuses 13 is an output apparatus such as a printer, a copier, a multifunction peripheral (MFP), or a laser printer. The image forming apparatus 13 performs user authentication by using the authentication server 12, acquires a job list or a job of an authenticated user from an information storing apparatus included in the parent image forming apparatus 13a, and displays the job list or performs printing of the job.

The configuration of the printing system 1 in FIG. 1 is an exemplary configuration of an image forming system. As described above, however, the image forming system may have another configuration.

A hardware configuration of a computer implementing each of the client terminal 11 and the authentication server 12 in FIG. 1 will be described.

Figure 2:
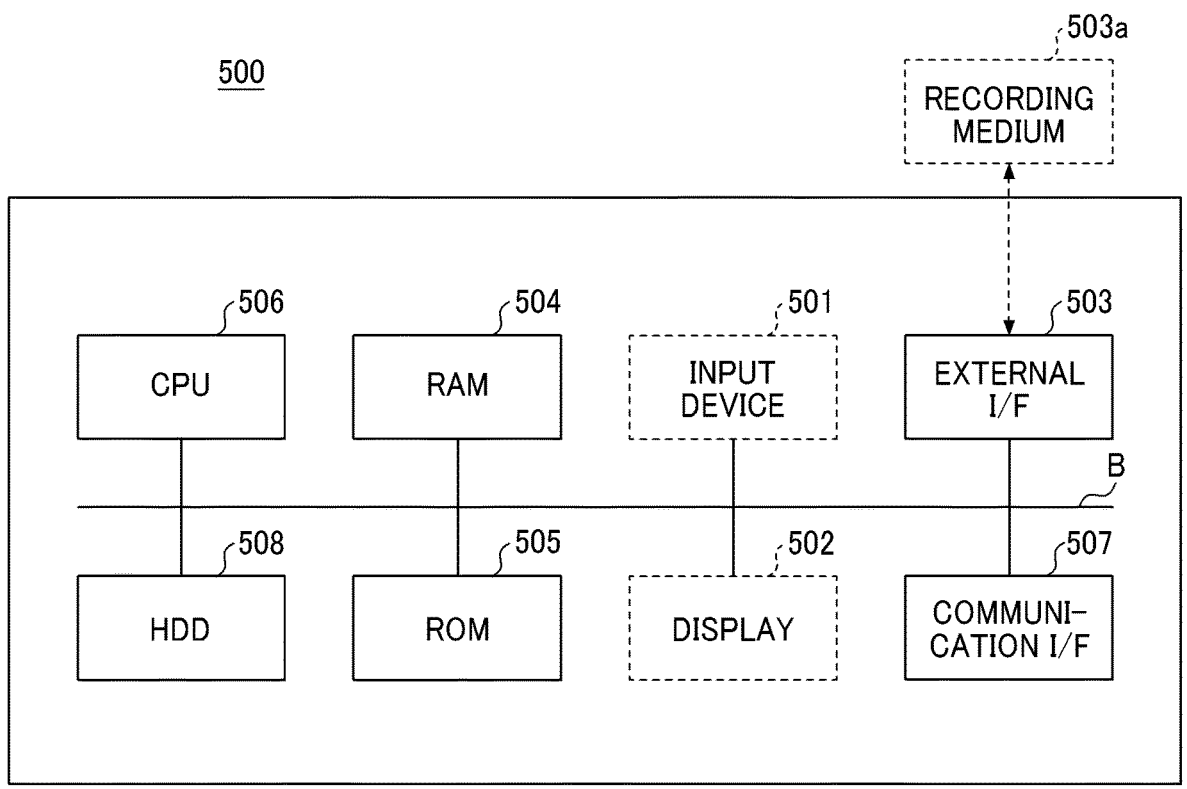
FIG. 2 is a block diagram illustrating an example of the hardware configuration of a computer implementing each of a client terminal and an authentication server forming the printing system according to the first embodiment.

Each of the client terminal 11 and the authentication server 12 in FIG. 1 is implemented by a computer having the hardware configuration illustrated in FIG. 2. FIG. 2 is a block diagram illustrating an example of the hardware configuration of a computer according to the first embodiment.

As illustrated in FIG. 2, a computer 500 includes an input device 501, a display 502, an external interface (I/F) 503, a random access memory (RAM) 504, a read only memory (ROM) 505, a central processing unit (CPU) 506, a communication I/F 507, and an HDD 508, which are electrically connected to each other via a bus B. The input device 501 and the display 502 may be used as connected to the computer 500 when necessary.

The input device 501 is implemented by devices such as a keyboard, a mouse, and a touch panel, and is used to input operation signals to the computer 500. The display 502 displays processing results of the computer 500.

The communication I/F 507 is an interface that connects the computer 500 to the network N1. Via the communication I/F 507, therefore, the computer 500 performs data communication.

The HDD 508 is an example of a nonvolatile storage device that stores programs and data. The programs and data stored in the HDD 508 include an operating system (OS) that is fundamental software controlling the entire computer 500 and applications that provide a variety of functions on the OS. In the computer 500, the HDD 508 may be replaced by a drive device using a flash memory as a storage medium, such as a solid state drive (SSD), for example.

The external I/F 503 is an interface to an external device such as a recording medium 503a. Via the external I/F 503, therefore, the computer 500 writes and/or reads data to and/or from the recording medium 503a. The recording medium 503a may be a flexible disk, a compact disc (CD), a digital versatile disc (DVD), a secure digital (SD) memory card, or a universal series bus (USB) memory, for example.

The ROM 505 is an example of a nonvolatile semiconductor memory (i.e., storage device) capable of holding a program or data even after the computer 500 is powered off. The ROM 505 stores programs and data for OS settings, network settings, and settings of a basic input/output system (BIOS) executed at startup of the computer 500, for example. The RAM 504 is an example of a volatile semiconductor memory that temporarily holds a program or data.

The CPU 506 is an example of an arithmetic device that loads programs and data onto the RAM 504 from storage devices such as the ROM 505 and the HDD 508 and executes processing with the programs and data, thereby controlling the entire computer 500 and implementing functions of the computer 500.

Each of the client apparatus 11 and the authentication server 12 according to the first embodiment executes programs on the computer 500 having the above-described hardware configuration, for example, to implement a variety of functions.

Figure 3:
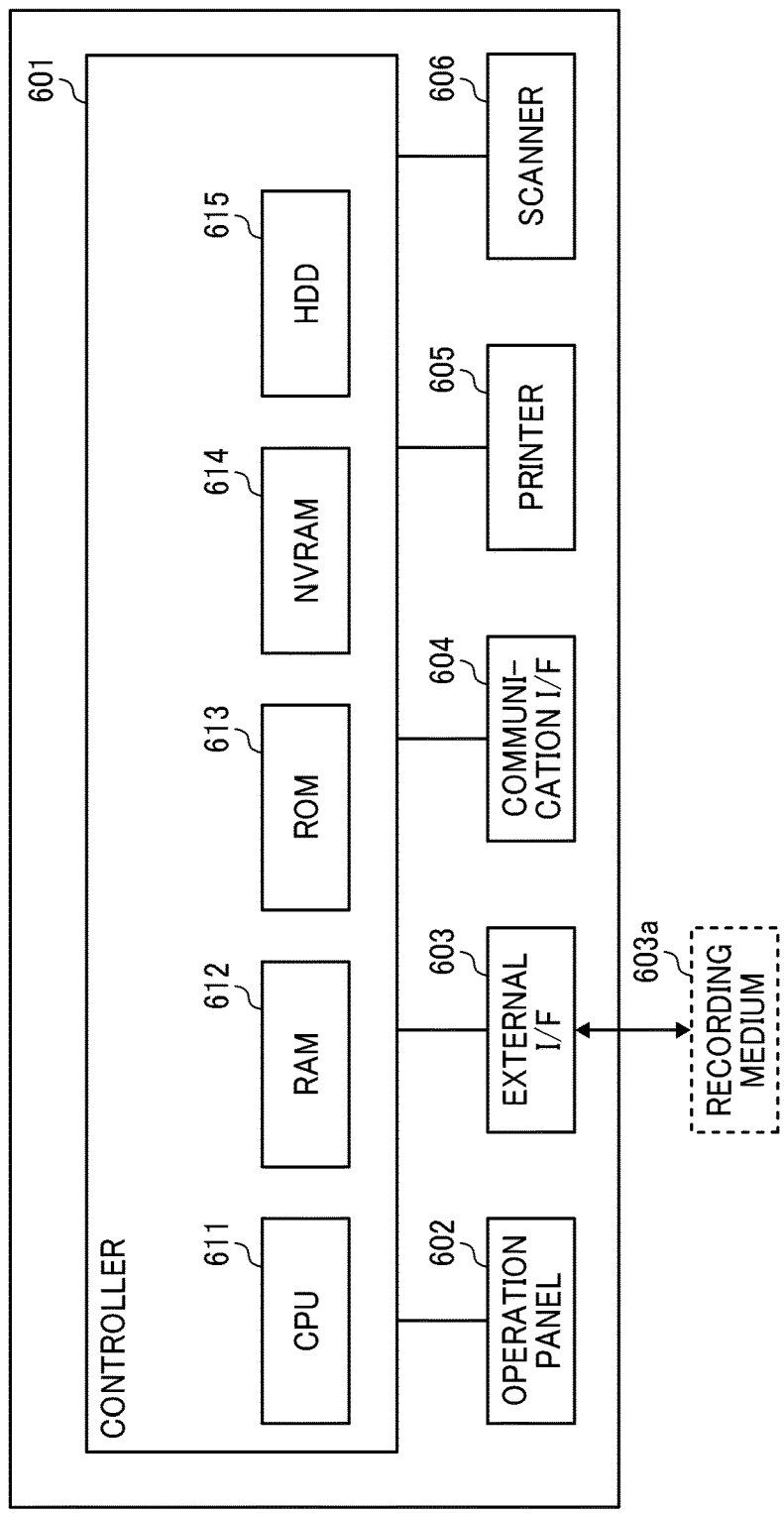
FIG. 3 is a block diagram illustrating an example of the hardware configuration of each of image forming apparatuses forming the printing system according to the first embodiment.

Each of the image forming apparatuses 13 in FIG. 1 is implemented by a computer having a hardware configuration such as that illustrated in FIG. 3, for example. FIG. 3 is a diagram illustrating an exemplary hardware configuration of the image forming apparatus 13 according to the first embodiment. The image forming apparatus 13 illustrated in FIG. 3 includes a controller 601, an operation panel 602, an external I/F 603, a communication I/F 604, a printer 605, and a scanner 606.

The controller 601 includes a CPU 611, a RAM 612, a ROM 613, a nonvolatile RAM (NVRAM) 614, and an HDD 615. The ROM 613 stores a variety of programs and data. The RAM 612 temporarily holds a program or data. The NVRAM 614 stores setting information, for example. The HDD 615 stores a variety of programs and data.

The CPU 611 loads programs, data, and setting information onto the RAM 612 from storage devices such as the ROM 613, the NVRAM 614, and the HDD 615 and executes processing with the programs, data, and setting information, thereby controlling the entire image forming apparatus 13 and implementing functions of the image forming apparatus 13.

The operation panel 602 includes an input device that receives input from the user and a display that displays information. The operation panel 602 is a touch panel, for example. By touching the operation panel 602, the user is capable of performing an operation such as pressing a button displayed on the operation panel 602.

The external I/F 603 is an interface to an external device such as a recording medium 603a. Via the external I/F 603, therefore, the image forming apparatus 13 writes and/or reads data to and/or from the recording medium 603a. The recording medium 603a may be an integrated circuit (IC) card, a flexible disk, a CD, a DVD, an SD memory card, or a USB memory, for example.

The communication I/F 604 is an interface that connects the image forming apparatus 13 to the network N1. Via the communication I/F 604, therefore, the image forming apparatus 13 performs data communication. The printer 605 is a printing device that prints print data on a sheet. The scanner 606 is a reading device that reads electronic image data from a document.

A software configuration of the client terminal 11 according to the first embodiment will be described.

Figure 4:
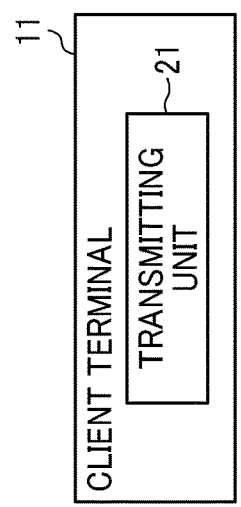
FIG. 4 is a functional block diagram illustrating an example of component elements of the client terminal according to the first embodiment.

The client terminal 11 according to the first embodiment is implemented by functional blocks illustrated in FIG. 4, for example. FIG. 4 is a functional block diagram illustrating an example of component elements of the client terminal 11 according to the first embodiment.

The functional blocks illustrated in FIG. 4 and subsequent functional block diagrams are conceptual, and the apparatuses illustrated therein are not necessarily required to be physically configured as illustrated therein. All or part of the functional blocks may be functionally or physically divided or combined in desired units. All or desired part of processing functions performed by the functional blocks may be implemented by a program executed by a CPU, or may be implemented as hardware with a wired logic.

The client terminal 11 executes a program to implement a transmitting unit 21. The transmitting unit 21 transmits a job including user information to an intended one of the image forming apparatuses 13. The functional block diagram of FIG. 4 illustrates the functional blocks to be discussed in the following description of the embodiment. Thus, the client terminal 11 may include other processing blocks.

A software configuration of the authentication server 12 according to the first embodiment will be described.

Figure 5:
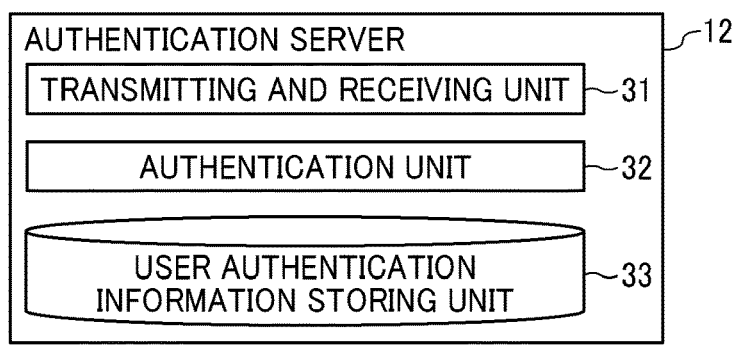
FIG. 5 is a functional block diagram illustrating an example of component elements of the authentication server according to the first embodiment.

The authentication server 12 according to the first embodiment is implemented by the functional blocks illustrated in FIG. 5, for example. FIG. 5 is a functional block diagram illustrating an example of component elements of the authentication server 12 according to the first embodiment. With the CPU 506 executing a program, the authentication server 12 in FIG. 5 implements a transmitting and receiving unit 31, an authentication unit 32, and a user authentication information storing unit 33.

The transmitting and receiving unit 31 receives, for example, a user name and a password of a logged-in user from the image forming apparatus 13 logged in to by the logged-in user, and transmits a result of authentication to the image forming apparatus 13. The authentication unit 32 performs an authentication process by referring to the user authentication information storing unit 33. For each of registered users, the user authentication information storing unit 33 previously stores the combination of the user name and the password as user authentication information. For example, the authentication unit 32 determines an authentication success when the combination of the user name and the password received from the image forming apparatus 13 is stored in the user authentication information storing unit 33 as the user authentication information.

A software configuration of each of the image forming apparatuses 13*b* and 13*c* according to the first embodiment will be described.

Figure 6:
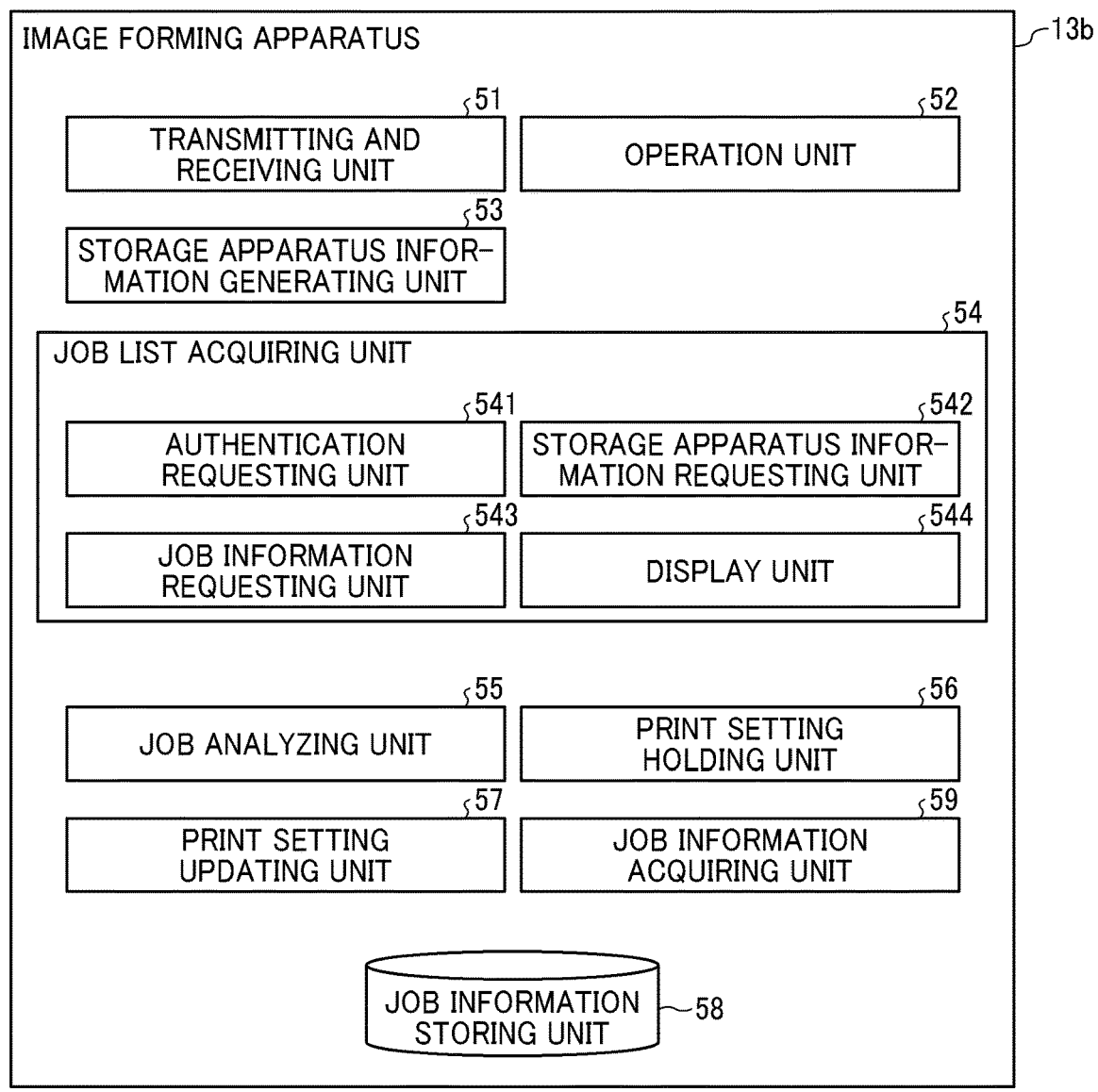
FIG. 6 is a functional block diagram illustrating an example of component elements of one of the image forming apparatuses according to the first embodiment.

Each of the image forming apparatuses 13*b* and 13*c* according to the first embodiment is implemented by functional blocks such as those illustrated in FIG. 6, for example. FIG. 6 is a functional block diagram illustrating an example of component elements of the image forming apparatus 13*b* according to the first embodiment. With the CPU 611 executing a program, the image forming apparatus 13*b* implements a transmitting and receiving unit 51, an operation unit 52, a storage apparatus information generating unit 53, a job list acquiring unit 54, a job analyzing unit 55, a print setting holding unit 56, a print setting updating unit 57, a job information storing unit 58, and a job information acquiring unit 59.

The transmitting and receiving unit 51 is implemented by the CPU 611 and the communication I/F 604, and transmits and receives signals and information such as jobs. The operation unit 52 is implemented by the operation panel 602, and receives user operations.

The storage apparatus information generating unit 53 is implemented by the CPU 611. The storage apparatus information generating unit 53 receives a job from the client terminal 11 via the transmitting and receiving unit 51, generates storage apparatus information based on the received job, and transmits the generated storage apparatus information to the parent image forming apparatus 13*a* via the transmitting and receiving unit 51. Herein, the storage apparatus information refers to information that identifies an image forming apparatus 13 included in the parent image forming apparatus 13*a* and the image forming apparatuses 13*b* and 13*c* connected to the network N1 and storing job information associated with the user information. The user information includes the user name, for example. The term "apparatus" in the "storage apparatus information" denotes one of the parent image forming apparatus 13*a* and the image forming apparatuses 13*b* and 13*c*, for example.

For example, when the image forming apparatus 13*b* receives a job from the client terminal 11, the storage apparatus information generating unit 53 generates the storage apparatus information indicating that the job information of the job is stored in the image forming apparatus 13*b*, and transmits the generated storage apparatus information to the parent image forming apparatus 13*a*.

The job list acquiring unit 54 acquires a job list by collecting the job information associated with the user information from each of the parent image forming apparatus 13*a* and the image forming apparatuses 13*b* and 13*c*. The job list acquiring unit 54 includes an authentication requesting unit 541, a storage apparatus information requesting unit 542, a job information requesting unit 543, and a display unit 544.

The authentication requesting unit 541 transmits information such as the user name and the password to the authentication server 12, and requests the authentication server 12 to perform user authorization. If an authorization result indicating an authentication success is received, the authentication requesting unit 541 acquires the user information, and outputs the acquired user information to the storage apparatus information requesting unit 542 and the job information requesting unit 543.

The storage apparatus information requesting unit 542 transmits the input user information to the parent image forming apparatus 13*a* via the transmitting and receiving unit 51, and requests the parent image forming apparatus 13*a* to transmit the storage apparatus information. The storage apparatus information requesting unit 542 then acquires the storage apparatus information from the parent image forming apparatus 13*a* via the transmitting and receiving unit 51, and outputs the acquired storage apparatus information to the job information requesting unit 543.

The job information requesting unit 543 transmits, via the transmitting and receiving unit 51, the user information to the image forming apparatus 13 identified based on the storage apparatus information, and acquires the job information associated with the user information from the image forming apparatus 13. The job information requesting unit 543 outputs the acquired job information to the display unit 544.

The job information requesting unit 543 further acquires the job information associated with the user information and stored in the image forming apparatus 13*b* by referring to the job information storing unit 58 of the image forming apparatus 13*b* based on the user information, and outputs the acquired job information to the display unit 544.

In the above-described example of the first embodiment, the job list acquiring unit 54 includes the authentication requesting unit 541 to acquire the user information through user authentication. However, the acquisition of the user information is not limited to this example. For example, the storage apparatus information requesting unit 542 and the job information requesting unit 543 may acquire and use, as the user information, information such as the user name input via the operation panel 602 by the user.

The display unit 544 extracts display information from each of the job information input from the image forming apparatus 13b and the job information input from the image forming apparatus 13c, and combines the two types of display information to generate the job list. The display information includes a job name included in the job information, for example, and is displayed as the job list on a screen of the operation panel 602. The screen of the generated job list is displayed on the operation panel 602. As well as the screen of the job list, the display unit 544 may also display a login screen and screens of various messages on the operation panel 602.

The job analyzing unit 55 analyzes the job received via the transmitting and receiving unit 51, acquires the job information of the job, and outputs print setting information included in the job information to the print setting holding unit 56. The print setting holding unit 56 holds the print setting information. If the acquired print setting information is different from the current print setting information, the print setting updating unit 57 updates the print setting information, and the print setting holding unit 56 holds the updated print setting information. The print setting information is used in the printing process. The print setting information includes setting information such as the quantity of prints to be made, the number of sides to be printed, and color information, for example.

The above-described storage apparatus information generating unit 53 desirably generates the storage apparatus information after the job analyzing unit 55 performs the job analysis. This is because the storage apparatus information generating unit 53 is capable of receiving the job information acquired through job analysis from the job analyzing unit 55 and using the received job information to generate the storage apparatus information.

The job information storing unit 58 stores the job information received from the client terminal 11 via the transmitting and receiving unit 51. The job information storing unit 58 is implemented by the HDD 615, for example.

The job information acquiring unit 59 receives the user information from the source of the request for the job information via the transmitting and receiving unit 51. The job information acquiring unit 59 acquires the job information associated with the user information by referring to the job information storing unit 58 based on the received user information. The job information acquiring unit 59 transmits the acquired job information to the source of the request for the job information via the transmitting and receiving unit 51.

The above description has been given of the image forming apparatus 13b as an example. This description of the image forming apparatus 13b similarly applies to the image forming apparatus 13c.

A software configuration of the parent image forming apparatus 13a according to the first embodiment will be described.

Figure 7:
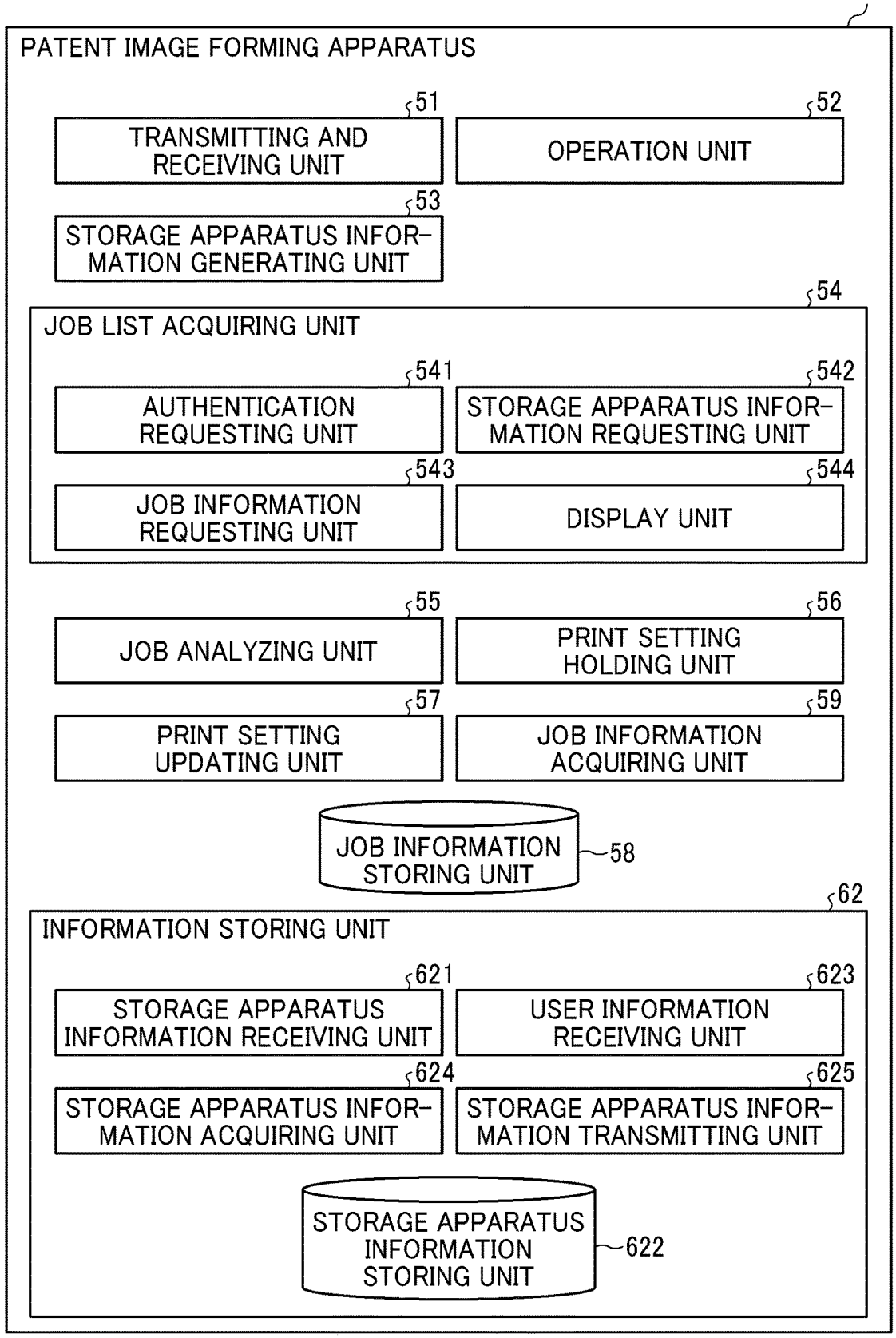
FIG. 7 is a functional block diagram illustrating an example of component elements of one of the image forming apparatuses according to the first embodiment serving as a parent apparatus.

The parent image forming apparatus 13a according to the first embodiment is implemented by functional blocks such as those illustrated in FIG. 7, for example. FIG. 7 is a functional block diagram illustrating an example of component elements of the parent image forming apparatus 13a according to the first embodiment. In FIG. 7, the same parts as those in FIG. 6 are denoted with the same reference numerals as those in FIG. 6, and description thereof will be omitted.

With the CPU 611 executing a program, the parent image forming apparatus 13a implements an information storing unit 62 that stores the storage apparatus information. The information storing unit 62 includes a storage apparatus information receiving unit 621, a storage apparatus information storing unit 622, a user information receiving unit 623, a storage apparatus information acquiring unit 624, and a storage apparatus information transmitting unit 625.

The storage apparatus information receiving unit 621 receives, via the transmitting and receiving unit 51, the storage apparatus information transmitted from the image forming apparatuses 13b and 13c, and outputs the received storage apparatus information to the storage apparatus information storing unit 622. The storage apparatus information storing unit 622 stores the input storage apparatus information. The storage apparatus information storing unit 622 is implemented by the HDD 615, for example.

The user information receiving unit 623 receives, via the transmitting and receiving unit 51, the user information transmitted from the image forming apparatuses 13b and 13c, and outputs the received user information to the storage apparatus information acquiring unit 624. As described above, each of the image forming apparatuses 13b and 13c transmits the user information to the parent image forming apparatus 13a when requesting the storage apparatus information.

The storage apparatus information acquiring unit 624 acquires the storage apparatus information by referring to the storage apparatus information storing unit 622 based on the input user information. The storage apparatus information acquiring unit 624 outputs the acquired storage apparatus information to the storage apparatus information transmitting unit 625. The storage apparatus information transmitting unit 625 transmits the input storage apparatus information to the image forming apparatus 13b or 13c as the source of the request for the storage apparatus information.

When the parent image forming apparatus 13a acquires the job list, the storage apparatus information acquiring unit 624 acquires the storage apparatus information by referring to the storage apparatus information storing unit 622 based on the user information acquired as a result of successful authentication. The parent image forming apparatus 13a is capable of generating the job list with the acquired storage apparatus information. The information storing unit 62 is an example of a part of the information storing apparatus. The information storing apparatus includes any apparatus with a memory functioning as an information storing unit.

In the first embodiment, the parent image forming apparatus 13a in the printing system 1 is set as a parent apparatus including the information storing unit 62. Alternatively, the image forming apparatus 13b or 13c may be set as the parent apparatus including the information storing unit 62.

The user authentication information stored in the user authentication information storing unit 33 of the authentication server 12 will be described.

FIG. 8 is a diagram illustrating an example of the configuration of the user authentication information. The user authentication information in FIG. 8 is combinations of user names and passwords previously stored in the user authentication information storing unit 33. The authentication unit 32 uses the user authentication information in FIG. 8 to determine a success or failure of user authentication based on the user name and the password received from the parent image forming apparatus 13a, the image forming apparatus 13b, or the image forming apparatus 13c, for example. In the user authentication information, the user name is used as the user information, for example.

The job information stored in the job information storing unit 58 of each of the image forming apparatuses 13 will be described.

FIGS. 9A and 9B are diagrams illustrating an example of the configuration of the job information. FIG. 9A illustrates items of the job information. FIG. 9B illustrates a specific example of the items of the job information. The job information illustrated in FIGS. 9A and 9B is stored in the job information storing unit 58 included in each of the parent image forming apparatus 13a and the image forming apparatuses 13b and 13c.

As illustrated in FIGS. 9A and 9B, the job information includes items: document identification (ID), user name, job name, job storage source, storage language, the number of pages, side setting, color information, and quantity. The document ID is an example of identification information of the job. The user name is an example of identification information of the user who has stored the job. The job name is an example of identification information of electronic data to be printed. The job storage source is an example of identification information representing the location in the HDD 615, for example, at which the electronic data to be printed is stored. The storage language is an example of identification information of a print job language (PJL) used in a job storage process performed by the user. The number of pages, the side setting, the color information, and the quantity represent print settings.

If the user name is used as the user information, for example, the user name as one of the items of the job information is referred to to identify the job information associated with the user information.

The storage apparatus information stored in the storage apparatus information storing unit 622 of the parent image forming apparatus 13a will be described. FIGS. 10A and 10B are diagrams illustrating an example of the configuration of the storage apparatus information. FIG. 10A illustrates items of the storage apparatus information. FIG. 10B illustrates a specific example of the items of the storage apparatus information. The storage apparatus information illustrated in FIGS. 10A and 10B is stored in the storage apparatus information storing unit 622 included in the parent image forming apparatus 13a.

As illustrated in FIGS. 10A and 10B, the storage apparatus information includes items: user name, storage apparatus host name, storage apparatus internet protocol (IP) address, storage apparatus IP address (IPv6), and storage apparatus port number. The user name is an example of identification information of the user who has stored the job. The storage apparatus host name is an example of identification information of the image forming apparatus 13 storing the job information.

Each of the storage apparatus IP address and the storage apparatus IP address (IPv6) is an example of identification information representing the location of the job information in the network N1. The storage apparatus port number is an example of identification information representing the end point for the OS to perform data communication.

If the user name is used as the user information, for example, the user name as one of the items of the storage apparatus information is referred to to identify the image forming apparatus 13 storing the job information associated with the user information.

Details of a process of the printing system 1 according to the first embodiment will be described below. In the following, it is assumed that the job list acquiring unit 54 of the image forming apparatus 13b in the printing system 1 acquires the job list by collecting the job information associated with the user information. It is also assumed that the image forming apparatus 13c stores the job information associated with the user information.

However, the process of the printing system 1 is not limited to this example, and the job list acquiring unit 54 of the image forming apparatus 13c may acquire the job list by collecting the job information associated with the user information. Further, the image forming apparatus 13b or the parent image forming apparatus 13a may store the job information associated with the user information.

The authentication process according to the first embodiment will be described.

Figure 11:
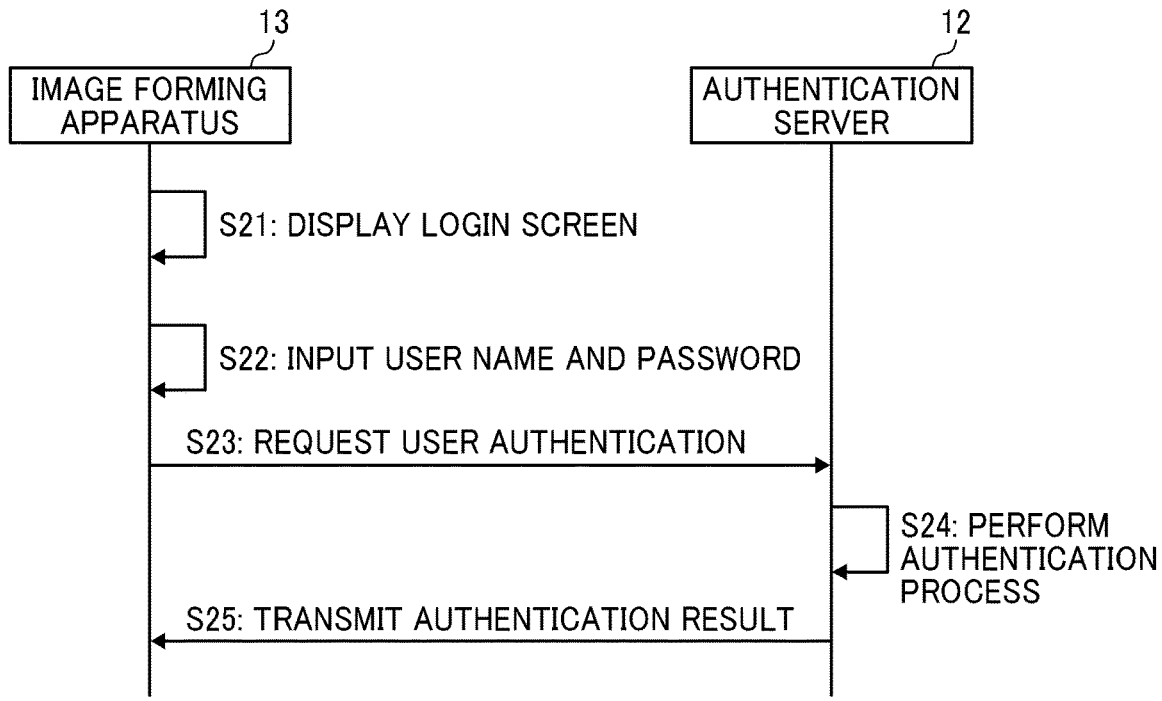
FIG. 11 is a sequence diagram illustrating an example of an authentication process according to the first embodiment.

FIG. 11 is a sequence diagram illustrating an example of the authentication process according to the first embodiment. The user first operates the operation panel 602 of the image forming apparatus 13b to request display of the login screen, and the display unit 544 displays the login screen on the operation panel 602 in response to the request (step S21).

The operation unit 52 receives the user authentication information input on the login screen by the user (step S22). The user authentication information includes the user name and the password, for example. The authentication requesting unit 541 transmits the user authentication information input by the user to the authentication server 12 to request the authentication server 12 to perform user authentication (step S23).

In the authentication server 12, the transmitting and receiving unit 31 receives the user authentication information from the image forming apparatus 13b. The authentication unit 32 performs the authentication process by referring to the user authentication information storing unit 33 (step S24). For example, if the combination of the user name and the password included in the user authentication information received from the image forming apparatus 13b is stored in the user authentication information storing unit 33 as the user authentication information, the authentication unit 32 determines an authentication success, and sets use authority for the user. If the combination of the user name and the password included in the received user authentication information is not stored in the user authentication information storing unit 33 as the user authentication information, the authentication unit 32 determines an authentication failure, and does not set use authority for the user.

The transmitting and receiving unit 31 of the authentication server 12 transmits to the image forming apparatus 13b an authentication result indicating the authentication success or failure (step S25). The authentication success indicates the success of login, while the authentication failure indicates the failure of login.

With the success of login, the printing system 1 sets the use authority for the user, and enables the image forming apparatus 13b to acquire the user information.

A job information acquisition process according to the first embodiment will be described with FIGS. 12 to 15.

Figure 12:
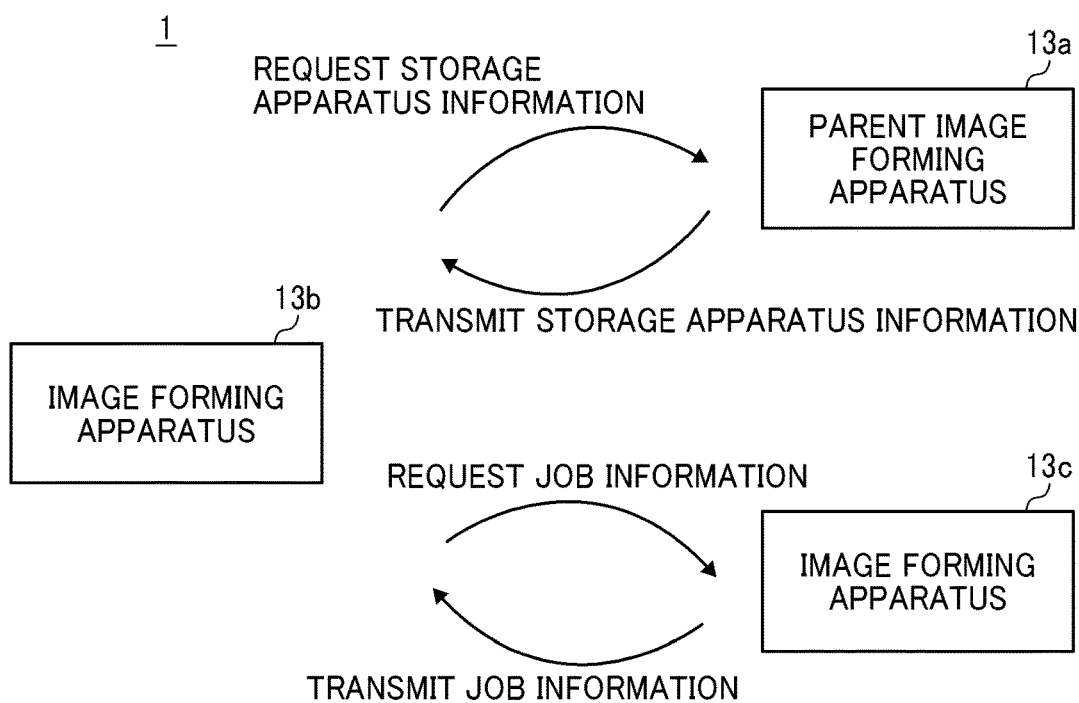
FIG. 12 is a diagram illustrating an example of a job information acquisition process according to the first embodiment.

FIG. 12 is a diagram illustrating an example of the job information acquisition process according to the first embodiment.

The storage apparatus information requesting unit 542 of the image forming apparatus 13b transmits the user information to the parent image forming apparatus 13a, and requests the parent image forming apparatus 13a to transmit the storage apparatus information.

The storage apparatus information acquiring unit 624 of the parent image forming apparatus 13a acquires the storage apparatus information by referring to the storage apparatus information storing unit 622 based on the user information received by the user information receiving unit 623. The storage apparatus information transmitting unit 625 transmits the acquired storage apparatus information to the image forming apparatus 13b.

The storage apparatus information requesting unit 542 of the image forming apparatus 13b outputs the received storage apparatus information to the job information requesting unit 543 of the image forming apparatus 13b. The job information requesting unit 543 of the image forming apparatus 13b transmits the user information to the image forming apparatus 13c identified based on the storage apparatus information, and requests the image forming apparatus 13c to transmit the job information associated with the user information.

The job information acquiring unit 59 of the image forming apparatus 13c acquires the job information associated with the user information by referring to the job information storing unit 58 of the image forming apparatus 13c based on the received user information. The job information acquiring unit 59 of the image forming apparatus 13c transmits the acquired job information to the image forming apparatus 13b.

The job information requesting unit 543 of the image forming apparatus 13b outputs the received job information to the display unit 544 of the image forming apparatus 13b. The job information requesting unit 543 of the image forming apparatus 13b further acquires the job information associated with the user information from the image forming apparatus 13b by referring to the job information storing unit 58 of the image forming apparatus 13b based on the user information, and outputs the acquired job information to the display unit 544 of the image forming apparatus 13b. The display unit 544 of the image forming apparatus 13b extracts the display information from each of the job information input from image forming apparatus 13c and the job information input from image forming apparatus 13b, and combines the two types of display information to generate a job list. The screen of the generated job list is displayed on the operation panel 602 of the image forming apparatus 13b.

Figure 13:
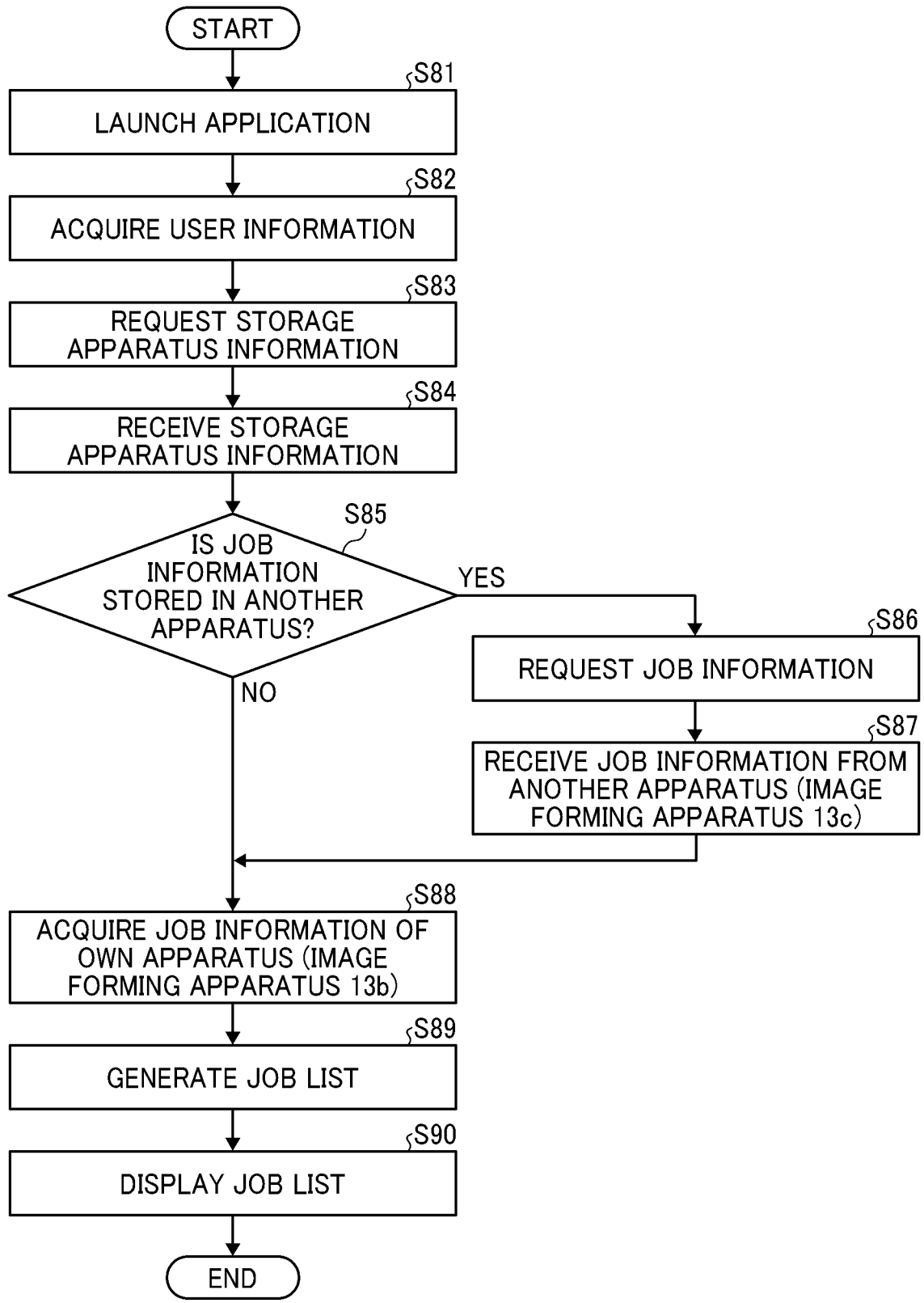
FIG. 13 is a flowchart illustrating an example of the job information acquisition process according to the first embodiment.

FIG. 13 is a flowchart illustrating an example of the job information acquisition process performed by the image forming apparatus 13b according to the first embodiment. The user first operates the operation panel 602 of the image forming apparatus 13b to request launch of an application for acquiring the job list, and the image forming apparatus 13b launches the application in response to the request (step S81).

After the launch of the application, the authentication requesting unit 541 transmits to the authentication server 12 the user authentication information input by the user in the authentication process, and requests the authentication server 12 to perform the user authentication. In response to the authentication result indicating the authentication success, the authentication requesting unit 541 acquires the user information (step S82). The authentication requesting unit 541 outputs the acquired user information to the storage apparatus information requesting unit 542 and the job information requesting unit 543.

The storage apparatus information requesting unit 542 transmits the input user information to the parent image forming apparatus 13a via the transmitting and receiving unit 51, and requests the parent image forming apparatus 13a to transmit the storage apparatus information (step S83). The storage apparatus information requesting unit 542 receives and acquires the storage apparatus information from the parent image forming apparatus 13a via the transmitting and receiving unit 51 (step S84).

Based on the storage apparatus information, the storage apparatus information requesting unit 542 determines whether the job information associated with the user information is stored in another apparatus (step S85).

If the storage apparatus information requesting unit 542 determines that the job information associated with the user information is stored in another apparatus (YES at step S85), the job information requesting unit 543 transmits the user information to the another apparatus storing the job information associated with the user information, and requests the another apparatus to transmit the job information (step S86). It is assumed in the first embodiment that the job information associated with the user information is stored in the image forming apparatus 13c (i.e., another apparatus). Therefore, the job information requesting unit 543 transmits the user information to the image forming apparatus 13c, and requests the image forming apparatus 13c to transmit the job information.

The job information requesting unit 543 receives the job information associated with the user information from the image forming apparatus 13c (step S87).

If the storage apparatus information requesting unit 542 determines that the job information associated with the user information is not stored in any other apparatus (NO at step S85), the procedure proceeds to step S88.

Then, the job information requesting unit 543 acquires the job information associated with the user information from the image forming apparatus 13b by referring to the job information storing unit 58 of the image forming apparatus 13b based on the user information (step S88). The job information requesting unit 543 outputs the job information acquired from the image forming apparatus 13b (i.e., own apparatus) and the job information acquired from the image forming apparatus 13c (i.e., another apparatus) to the display unit 544.

The display unit 544 extracts the display information from each of the job information input from the image forming apparatus 13c and the job information input from the image forming apparatus 13b, and combines the two types of display information to generate a job list (step S89). The display unit 544 displays the screen of the generated job list on the operation panel 602 of the image forming apparatus 13b (step S90).

The job list acquiring unit 54 of the image forming apparatus 13b thus acquires the job list by collecting the job information associated with the user information.

Figure 14:
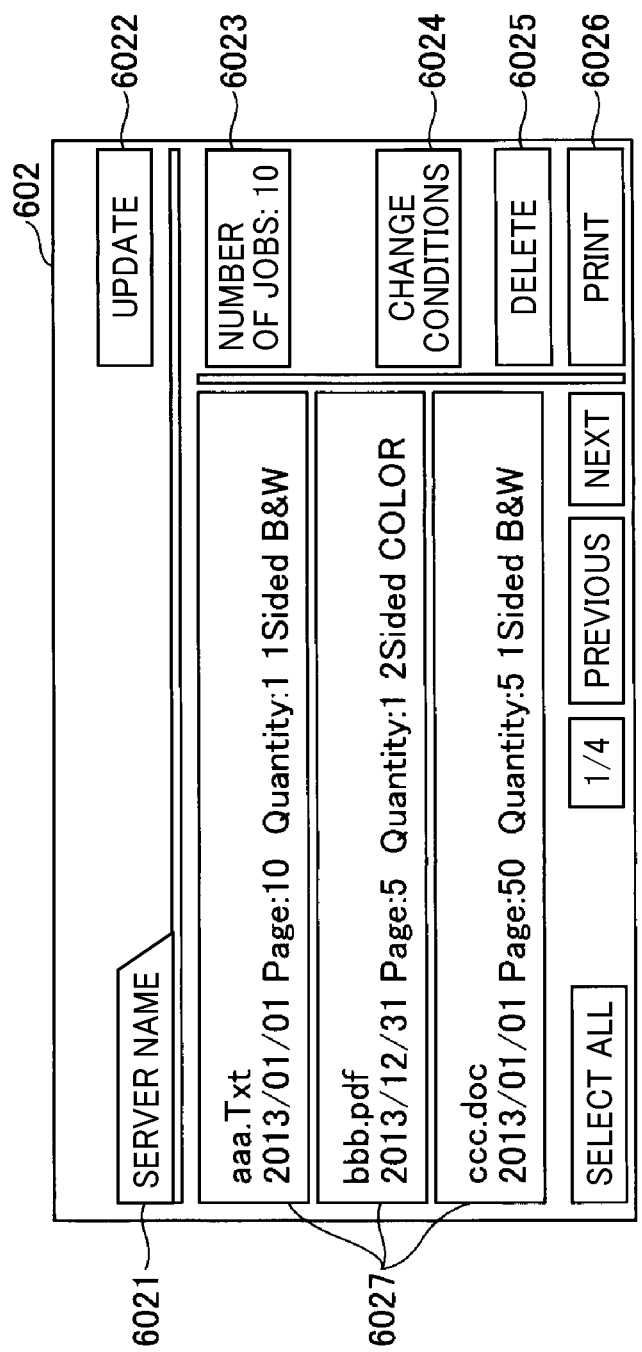
FIG. 14 is a diagram illustrating an example of a screen displaying a job list according to the first embodiment.

FIG. 14 is a diagram illustrating an example of the screen displaying the job list according to the first embodiment. FIG. 14 illustrates a screen displayed on the operation panel 602 of the image forming apparatus 13b. As illustrated in FIG. 14, the screen of the operation panel 602 includes a name label 6021, an update button 6022, a job count label 6023, a change conditions button 6024, a delete button 6025, a print button 6026, and a job selection button 6027.

The name label 6021 displays a title and a server name. When the update button 6022 is pressed, the display unit 544 updates the content displayed on the screen. The job count label 6023 displays the number of collected jobs associated with the user information.

When the change conditions button 6024 is pressed, the display unit 544 changes print conditions in the job storage process. When the delete button 6025 is pressed, the display unit 544 deletes the selected job. When the print button 6026 is pressed, the display unit 544 transmits an instruction to the printer 605 to execute the selected job.

The job selection button 6027 displays a list of jobs associated with the user information. The content displayed in the job selection button 6027 is previously selected and set from information included in the job information, and may be changed as appropriate. In the example of FIG. 14, the job selection button 6027 displays the job name, the execution date of the job storage process, the number of pages, the quantity, the side setting, and the color information. For example, the side setting is displayed as "1 Sided" for printing only on the front side of a sheet, and is displayed as "2 Sided" for printing on both of the front side and the back side of a sheet. The color information is displayed as "B & W" for monochrome printing, and is displayed as "COLOR" for color printing.

One of the jobs in the job selection button 6027 is pressed to select a job for a desired process such as printing or deletion, thereby enabling the user to select a desired job from the stored jobs and execute the job at a desired time. Further, in the first embodiment, the user authentication process is executed, thereby ensuring the security of the jobs stored by the user.

FIG. 15 is a diagram illustrating an example of a print-in-progress display screen according to the first embodiment. FIG. 15 illustrates a screen displayed on the operation panel 602 when the printing process is executed in response to pressing the print button 6026 in FIG. 14 with a job "aaa.Txt" in the job selection button 6027 being selected.

A storage apparatus information storing process according to the first embodiment will be described with reference to FIG. 16.

Figure 16:
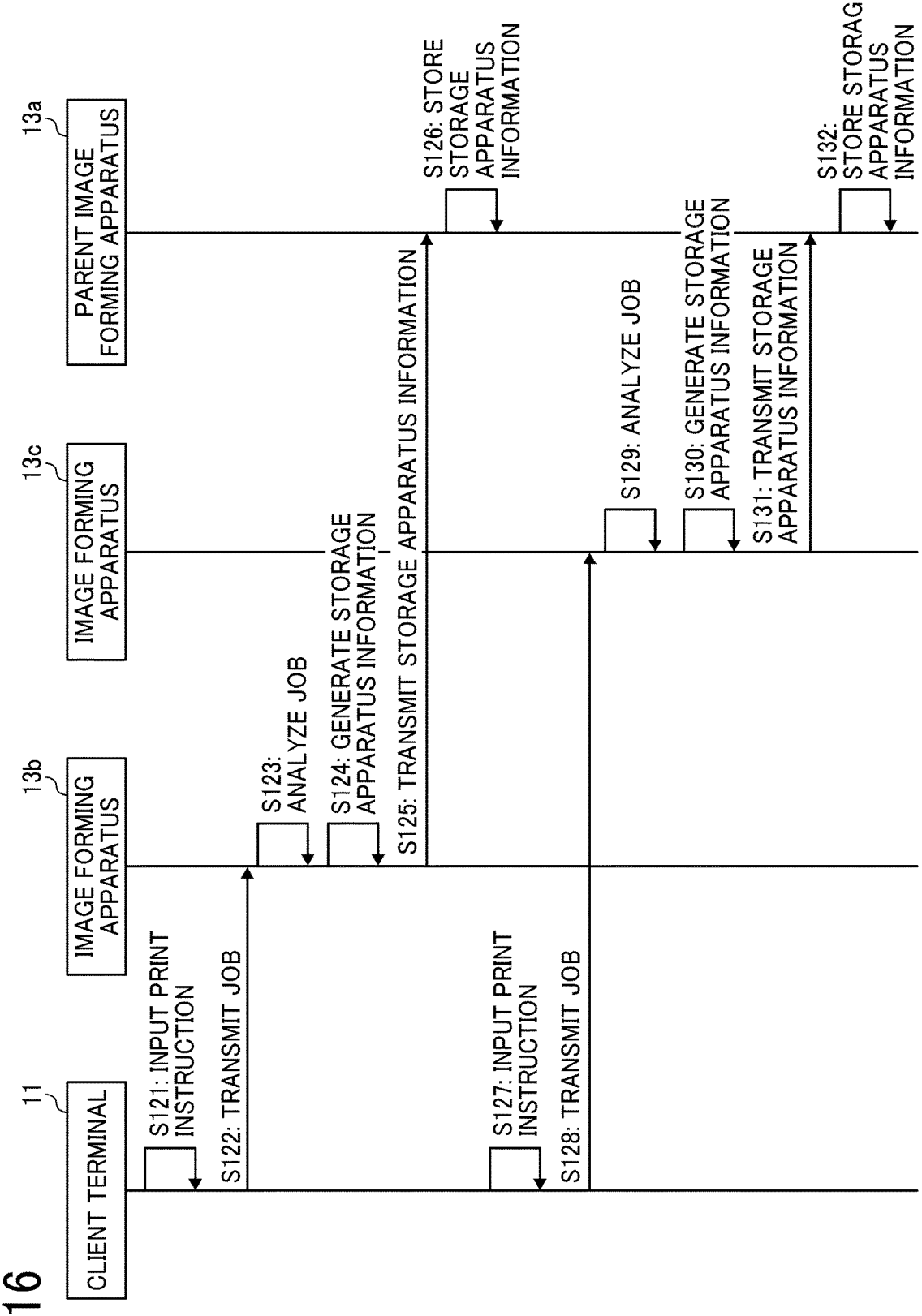
FIG. 16 is a sequence diagram illustrating an example of a storage apparatus information storing process according to the first embodiment.

FIG. 16 is a sequence diagram illustrating an example of the storage apparatus information storing process according to the first embodiment. FIG. 16 illustrates a process in which the client terminal 11 transmits jobs to the image forming apparatuses 13*b* and 13*c*, which then transmit the storage apparatus information to the parent image forming apparatus 13*a*. FIG. 16 further illustrates a process in which the parent image forming apparatus 13*a* stores the received storage apparatus information.

In response to a user operation performed on the input device 501 of the client terminal 11, the client terminal 11 inputs a print instruction to the image forming apparatus 13*b* (step S121). In response to the print instruction, the client terminal 11 transmits a job to the image forming apparatus 13*b* (step S122).

The job analyzing unit 55 of the image forming apparatus 13*b* analyzes the job received from the client terminal 11 via the transmitting and receiving unit 51, to thereby acquire the job information such as that illustrated in FIGS. 9A and 9B (step S123). The job analyzing unit 55 outputs the acquired job information to the storage apparatus information generating unit 53 of the image forming apparatus 13*b*.

Based on the input job information, the storage apparatus information generating unit 53 of the image forming apparatus 13*b* generates the storage apparatus information such as that illustrated in FIGS. 10A and 10B (step S124), and transmits the generated storage apparatus information to the parent image forming apparatus 13*a* via the transmitting and receiving unit 51 of the image forming apparatus 13*b* (step S125).

The storage apparatus information receiving unit 621 of the parent image forming apparatus 13*a* receives the storage apparatus information via the transmitting and receiving unit 51 of the parent image forming apparatus 13*a*, and outputs the received storage apparatus information to the storage apparatus information storing unit 622 of the parent image forming apparatus 13*a*. The storage apparatus information storing unit 622 of the parent image forming apparatus 13*a* stores the input storage apparatus information (step S126).

In response to a user operation performed on the input device 501 of the client terminal 11, the client terminal 11 inputs a print instruction to the image forming apparatus 13*c* (step S127). In response to the print instruction, the client terminal 11 transmits a job to the image forming apparatus 13*c* (step S128).

The job analyzing unit 55 of the image forming apparatus 13*c* analyzes the job received from the client terminal 11 via the transmitting and receiving unit 51 of the image forming apparatus 13*c*, to thereby acquire the job information (step S129). The job analyzing unit 55 of the image forming apparatus 13*c* outputs the acquired job information to the storage apparatus information generating unit 53 of the image forming apparatus 13*c*.

Based on the input job information, the storage apparatus information generating unit 53 of the image forming apparatus 13*c* generates the storage apparatus information (step S130), and transmits the generated storage apparatus information to the parent image forming apparatus 13*a* via the transmitting and receiving unit 51 of the image forming apparatus 13*c* (step S131).

The storage apparatus information receiving unit 621 of the parent image forming apparatus 13*a* receives the storage apparatus information via the transmitting and receiving unit 51 of the parent image forming apparatus 13*a*, and outputs the received storage apparatus information to the storage apparatus information storing unit 622 of the parent image forming apparatus 13*a*. The storage apparatus information storing unit 622 of the parent image forming apparatus 13*a* stores the input storage apparatus information (step S132).

The parent image forming apparatus 13*a* thereby stores the storage apparatus information in the storage apparatus information storing unit 622.

As described above, in the printing system 1 according to the first embodiment, the image forming apparatus 13 storing the job information associated with the user information is identified based on the storage apparatus information stored in the parent image forming apparatus 13*a*, and the identified image forming apparatus 13 is requested to transmit the job information. This configuration obviates the need for checking with an image forming apparatus 13 not storing the job information to determine whether the job information is stored therein. Accordingly, unnecessary communication is avoided, thereby suppressing an increase in communication load.

Further, hardware storing the job information, such as an HDD, may have a limit to a power supply time or a data wiring time (i.e., a limited lifetime). Therefore, checking with an image forming apparatus 13 not storing the job information to determine whether the job information is stored therein unnecessarily degrades the hardware by supplying power and writing data thereto. The first embodiment prevents such hardware degradation.

Further, in the standby state of the image forming apparatus 13, the image forming apparatus 13 may be brought into the sleep state in which a part of the functions of the image forming apparatus 13 is limited, to thereby reduce power consumption. If the image forming apparatus 13 in the sleep state receives an inquiry as to whether the job information is stored therein, the image forming apparatus 13 may return from the sleep state to the normal state in which the limitation on the part of the functions of the image forming apparatus 13 is lifted. Such return of the image forming apparatus 13 to the normal state unnecessarily consumes power when the job information is not stored in the image forming apparatus 13. The first embodiment prevents such unnecessary power consumption.

An example of an image forming system according to a second embodiment of the present invention will now be described. Description of the same parts as those of the foregoing first embodiment will be omitted.

Figure 17:
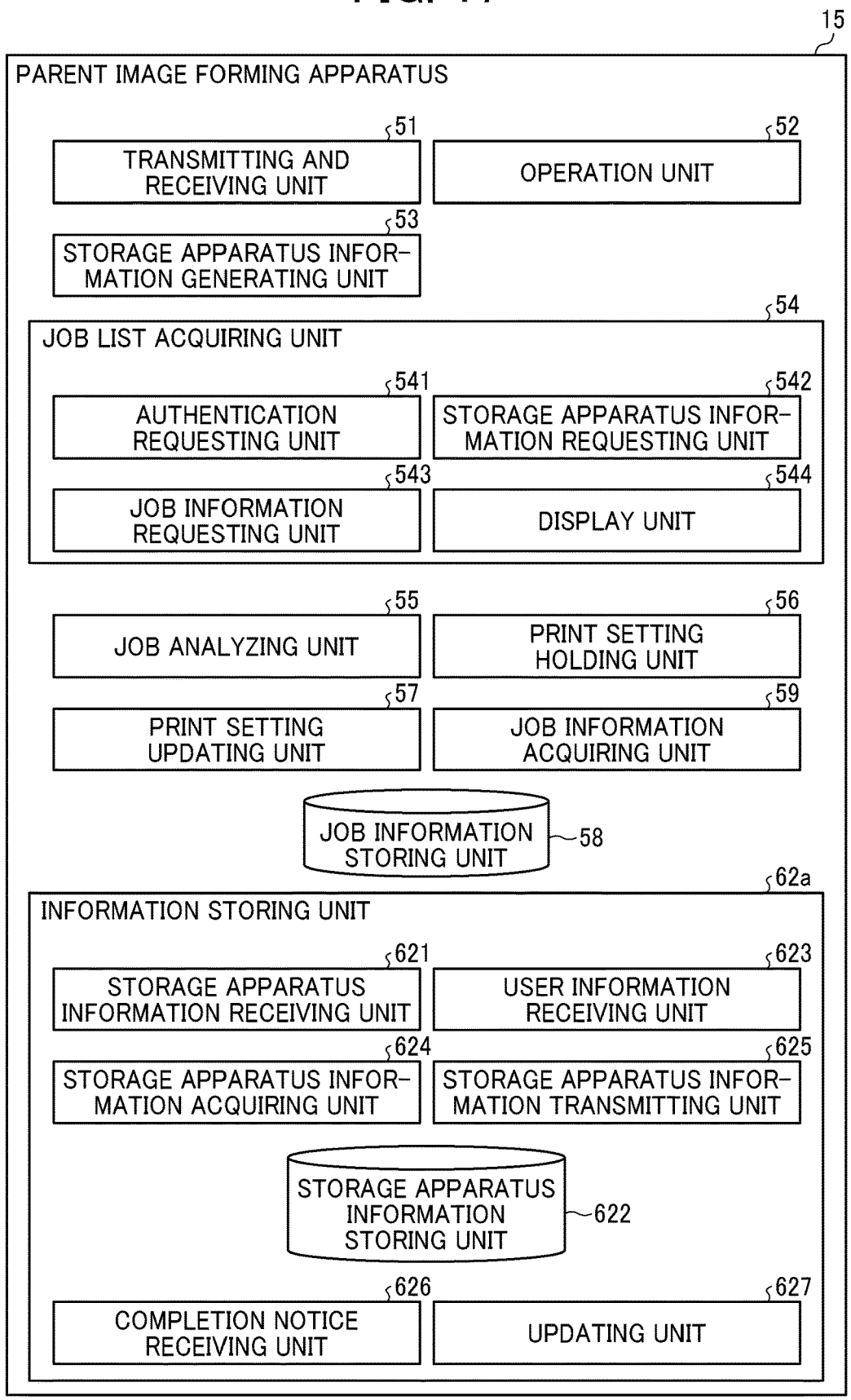
FIG. 17 is a functional block diagram illustrating an example of component elements of an image forming apparatus according to a second embodiment of the present invention serving as a parent apparatus.

In the second embodiment, a parent image forming apparatus 15 included in a printing system 1a updates the storage apparatus information. FIG. 17 is a functional block diagram illustrating an example of component elements of the parent image forming apparatus 15 according to the second embodiment.

With the CPU 611 executing a program, the parent image forming apparatus 15 implements an information storing unit 62a that includes a completion notice receiving unit 626 and an updating unit 627.

The completion notice receiving unit 626 receives a signal indicating the completion of job execution from each of the image forming apparatuses 13b and 13c in the printing system 1a via the transmitting and receiving unit 51. The signal indicating the completion of job execution includes a signal representing a job, printing of which has been completed. The completion notice receiving unit 626 outputs the signal representing the executed job to the updating unit 627. The updating unit 627 deletes the storage apparatus information of the executed job from the storage apparatus information storing unit 622.

Figure 18:
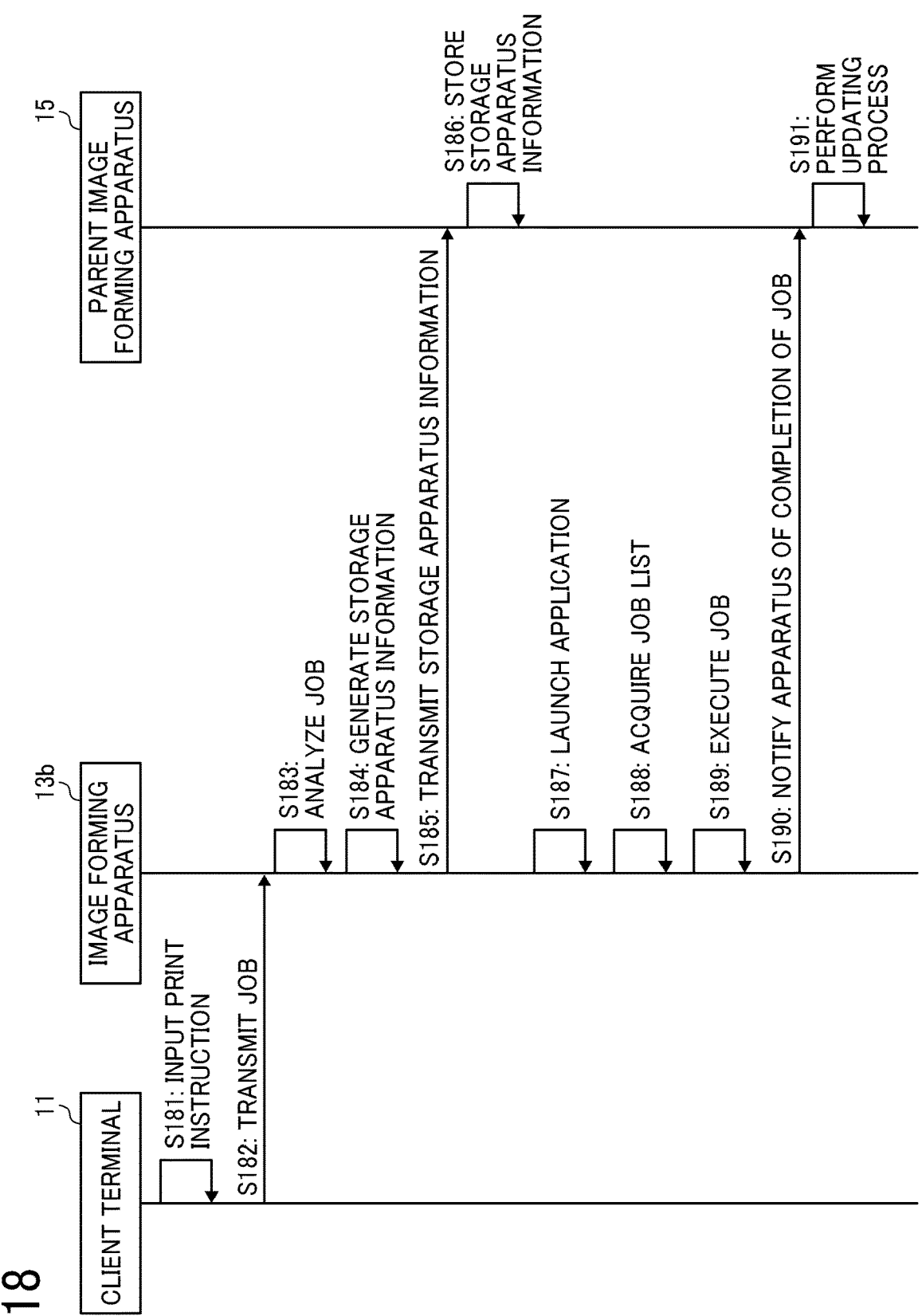
FIG. 18 is a sequence diagram illustrating an example of an updating process according to the second embodiment.

FIG. 18 is a sequence diagram illustrating an example of an updating process according to the second embodiment. FIG. 18 illustrates a process in which the client terminal 11 transmits a job to the image forming apparatus 13b, the image forming apparatus 13b transmits the storage apparatus information to the parent image forming apparatus 15, and the parent image forming apparatus 15 stores the storage apparatus information. FIG. 18 further illustrates a process in which the image forming apparatus 13b acquires the job list and completes the job execution, and thereafter the parent image forming apparatus 15 updates the information in the storage apparatus information storing unit 622.

The processes of steps S181 to S186 in FIG. 18 are similar to those of steps S121 to S126 in FIG. 16, and thus description thereof will be omitted.

The user operates the operation panel 602 of the image forming apparatus 13b to request launch of the application for acquiring the job list, and the image forming apparatus 13b launches the application in response to the request (step S187). Thereafter, the job list acquiring unit 54 of the image forming apparatus 13b acquires the job list by executing the process described above with FIG. 13 (step S188).

The user operates the operation panel 602 of the image forming apparatus 13b to select a job desired to be printed, and executes printing of the job (step S189). After the printing is completed, the image forming apparatus 13b transmits the signal indicating the completion of job execution to the parent image forming apparatus 15 via the transmitting and receiving unit 51 of the image forming apparatus 13b (step S190).

The completion notice receiving unit 626 of the parent image forming apparatus 15 receives a completion notice indicating the completion of job execution via the transmitting and receiving unit 51 of the parent image forming apparatus 15. The completion notice receiving unit 626 outputs the signal representing the executed job to the updating unit 627. The updating unit 627 deletes the storage apparatus information of the executed job from the storage apparatus information storing unit 622 (step S191).

The parent image forming apparatus 15 of the printing system 1a thus updates the storage apparatus information.

As described above, in the printing system 1a according to the second embodiment, the parent image forming apparatus 15 deletes the storage apparatus information of the executed job from the storage apparatus information storing unit 622 in accordance with the signal indicating the completion of job execution. With this configuration, a load on the storage capacity of the storage apparatus information storing unit 622 is reduced. Further, for example, the configuration reduces a burden on the user such as operating the operation panel 602 to manually delete the job information and the storage apparatus information of the executed job.

The foregoing description has been given of the job list acquiring apparatuses (i.e., information processing apparatuses), the information storing apparatuses, and the image forming systems according to the embodiments. The present invention, however, is not limited to the foregoing embodiments, and may be modified or improved within the scope of the invention.

Further, the foregoing embodiments include a job list acquiring method. For example, the job list acquiring method is performed by a job list acquiring apparatus that acquires the job list by collecting the job information associated with the user information from a plurality of image forming apparatuses connected to a network. The job list acquiring method includes acquiring from the information storing apparatus the storage apparatus information identifying the image forming apparatus storing the job information by specifying the user information in response to receipt of a user operation, acquiring the job information from the identified image forming apparatus, generating the job list based on the acquired job information, and displaying the generated job list. The job list acquiring method has effects similar to those of the job list acquiring apparatus of the above-described image forming system. The job list acquiring method may be implemented by a circuit such as a CPU or a large-scale integration (LSI) circuit, an IC card, or a single module, for example.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing apparatus communicable with an information storing apparatus that is communicable with a plurality of image forming apparatuses connected to a network and is configured to store storage apparatus information, the storage apparatus information identifying an image forming apparatus storing, for each user, job information associated with user information of each user, the information processing apparatus comprising one or more processors configured to in response to receipt of an operation performed by a user, acquire, from the information storing apparatus, storage apparatus information, collectively stored in the information storing apparatus, and identifying one or more image forming apparatuses of the plurality of image forming apparatuses storing job information associated with user information of the user, acquire the job information associated with the user information of the user from the one or more image forming apparatuses identified by the acquired storage apparatus information, generate a job list based on the acquired job information, and display the generated job list on a display.

2. The information processing apparatus of claim 1, wherein the one or more processors transmit a request to authenticate the user to an authentication server via the network, and when a result of authentication of the user indicates success of the authentication, the one or more processors acquire the job information associated with the user information of the user from the one or more image forming apparatuses.

3. The information processing apparatus of claim 1, wherein the information processing apparatus is formed by at least one of the plurality of image forming apparatuses.

4. An information storing apparatus communicable with a plurality of image forming apparatuses connected to a network, the information storing apparatus comprising:

a memory configured to collectively store storage apparatus information identifying an image forming apparatus storing, for each user, job information associated with user information of each user; and one or more processors configured to receive the storage apparatus information transmitted from each of the plurality of image forming apparatuses, and store the received storage apparatus information in the memory, refer to the memory based on user information received from an information processing apparatus operated by a user and communicable with the information storing apparatus, and acquire storage apparatus information identifying one or more image forming apparatuses of the plurality of image forming apparatuses storing job information associated with the received user information, and transmit the acquired storage apparatus information to the information processing apparatus from which the user information is received.

5. The information storing apparatus of claim 4, wherein the one or more processors update the storage apparatus information stored in the memory.

6. The information storing apparatus of claim 4, wherein the one or more processors receive, from at least one of the plurality of image forming apparatuses, a signal indicating completion of execution of a job, and in response to receipt of the signal indicating completion of execution of the job, delete the storage apparatus information corresponding to the executed job from the memory.

7. The information storing apparatus of claim 4, wherein the information storing apparatus is formed by one of the plurality of image forming apparatuses.

8. An image forming system comprising:

an information storing apparatus communicable with a plurality of image forming apparatuses connected to a network; and an information processing apparatus communicable with the information storing apparatus, the information storing apparatus including a memory configured to collectively store storage apparatus information identifying an image forming apparatus storing, for each user, job information associated with user information of each user, and one or more first processors configured to receive the storage apparatus information transmitted from each of the plurality of image forming apparatuses, and store the received storage apparatus information in the memory, refer to the memory based on user information received from the information processing apparatus, and acquire storage apparatus information identifying one or more image forming apparatuses of the plurality of image forming apparatuses storing job information associated with the received user information, and transmit the acquired storage apparatus info nation to the information processing apparatus from which the user information is received, and the information processing apparatus including one or more second processors configured to in response to receipt of an operation performed by a user, transmit user information of the user to the info illation storing apparatus, receive storage apparatus information corresponding to the user information of the user from the information storing apparatus, acquire job information associated with the user information of the user from one or more image forming apparatuses of the plurality of image forming apparatuses identified by the storage apparatus information, generate a job list based on the acquired job information, and display the generated job list on a display.

9. The image forming system of claim 8, further comprising:

the plurality of image forming apparatuses, wherein each of the information storing apparatus and the information processing apparatus is formed by one of the plurality of image forming apparatuses.

10. The image forming system of claim 9, wherein each of the plurality of image forming apparatuses includes one or more third processors configured to analyze a job received by the each of the plurality of image forming apparatuses, and generate the storage apparatus information after the job is analyzed.

11. The image forming system of claim 10, wherein the one or more third processors of the each of the plurality of image forming apparatuses transmit the generated storage apparatus information to the information storing apparatus.

12. The information processing apparatus of claim 1, wherein the information processing apparatus is formed by a first image forming apparatus among the plurality of image forming apparatuses, and the first image forming apparatus is different from a second image forming apparatus among the plurality of image forming apparatuses, the second image forming apparatus forming the information storing apparatus.

13. The information storing apparatus of claim 4, wherein the information storing apparatus is formed by a parent image forming apparatus among the plurality of image forming apparatuses, and the parent image forming apparatus is different from one of the plurality of image forming apparatuses forming the information processing apparatus.

14. The image forming system of claim 8, wherein
the information processing apparatus is formed by a first image forming apparatus among the plurality of image forming apparatuses,
the information storing apparatus is formed by a second image forming apparatus among the plurality of image forming apparatuses, and
the second image forming apparatus is different from the first image forming apparatus.

\* \* \* \* \*